United States Patent
Jakob et al.

(10) Patent No.: US 6,929,099 B2
(45) Date of Patent: Aug. 16, 2005

(54) ROTARY FEED-THROUGH

(75) Inventors: Ludwig Jakob, Kleinwallstadt (DE); Josef Greif, Friesenried (DE); Wolfgang Bechteler, Biessenhofen (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 0 days.

(21) Appl. No.: 10/763,065

(22) Filed: Jan. 21, 2004

(65) Prior Publication Data

US 2004/0200670 A1 Oct. 14, 2004

Related U.S. Application Data

(63) Continuation of application No. PCT/EP03/05881, filed on Jun. 4, 2003.

(30) Foreign Application Priority Data

Jun. 7, 2002 (DE) .......................................... 102 25 272

(51) Int. Cl.[7] .............................................. F16L 27/00
(52) U.S. Cl. ......................... 184/109; 409/136; 137/109
(58) Field of Search ......................... 184/109; 137/580; 409/136

(56) References Cited

U.S. PATENT DOCUMENTS

| | | | | |
|---|---|---|---|---|
| 4,702,276 A | * | 10/1987 | Bouteille et al. | 137/580 |
| 4,976,282 A | * | 12/1990 | Kubala | 137/580 |
| 5,439,029 A | * | 8/1995 | Becker | 137/580 |
| 5,538,292 A | * | 7/1996 | Sommer | 285/13 |
| 5,694,976 A | * | 12/1997 | Frye-Hammelmann | 137/580 |
| 5,707,186 A | * | 1/1998 | Gobell et al. | 409/136 |
| 6,085,782 A | * | 7/2000 | Ott | 137/580 |
| 6,308,734 B1 | * | 10/2001 | Smith et al. | 137/580 |
| 6,386,221 B1 | * | 5/2002 | Knoll et al. | 137/15.21 |
| 6,406,065 B1 | * | 6/2002 | Ott et al. | 285/120.1 |
| 6,602,031 B2 | * | 8/2003 | Hara | 409/131 |

FOREIGN PATENT DOCUMENTS

| | | |
|---|---|---|
| DE | 3810060 A1 | 10/1989 |
| DE | 199 32 355 A1 | 1/2001 |

* cited by examiner

*Primary Examiner*—Chong H. Kim
(74) *Attorney, Agent, or Firm*—Martin Fleit; Paul D. Bianco; Fleit Kain Gibbons Gutman Bongini & Bianco

(57) ABSTRACT

A rotary feed-through, which contains a hollow shaft, which is supported in a first housing part so that it can rotate, with a first sealing surface and a sealing bushing, which is arranged rotationally fixed within a second housing part and which is coaxial with the hollow shaft, with a second sealing surface for contact to the first sealing surface. In order to also enable lower leakage losses, in addition to less wear, with the supply of cooling lubricants and compressed air, the second housing part contains a first lateral supply channel, which can be attached to a coolant supply line or a compressed air supply line, for the supply of cooling lubricant or compressed air via at least one radial opening of the sealing bushing and a second supply channel, which is charged during the supply of cooling lubricant, for the supply of cooling lubricant to a pressure piston, which closes the rear end of the sealing bushing, to increase the contact pressure of the sealing surfaces.

12 Claims, 2 Drawing Sheets

ROTARY FEED-THROUGH

RELATED APPLICATION

This application is a continuation of International Application PCT/EP03/05881 filed Jun. 4, 2003, the contents of which are here incorporated by reference in their entirety, and priority is claimed therefor under 35 USC 120.

BACKGROUND OF THE INVENTION

1. Field of Invention

The invention relates to a rotary feed-through.

2. Prior Art

Such rotary feed-throughs are used to supply fluid to a rotating machine part. In particular, with machine tools, such rotary feed-throughs are used to feed a cooling lubricant into a hollow working spindle of the machine tool for cooling or cleaning tools and/or the work point. For typical rotary feed-throughs, the interface between the rotating and the stationary part is formed by sealed bushings or sealing rings with sealing surfaces sliding one on top of the other. For the supply of a lubricant medium, such as, e.g., cooling lubricant, the sealing gap between the two sliding surfaces is lubricated, which prevents too high a temperature load and too much wear and tear. However, there are also applications for which a non-lubricating medium must be supplied. Thus, for certain applications, e.g., a supply of compressed air for cooling the tool and/or workpiece or also for removing shavings is necessary. However, here there is the problem that the resulting lack of lubrication on the sliding surface leads to an increased build-up of heat and increased wear and tear.

From DE 199 32 355 A1, a rotary feed-through according to this class is known for alternating media. However, in this document, the sealing surfaces are only in contact when a lubricating medium is supplied. For the supply of a non-lubricating medium, the sealing surfaces are moved away from each other in order to prevent too much wear and tear on the sealing surfaces. In order to minimize the resulting leakage losses, there is an additional cylindrical seal in the form of a sealing gap between the outer wall of a rotationally fixed sleeve and the inner wall of a hollow shaft.

For another type of rotary feed-through, the problem of lubrication and cooling of the sliding surfaces is solved by supplying the sealing elements, which slide one on top of the other, with an additional coolant or lubricant from the outside. However, this requires constructional expense that is not insignificant, because the additional coolant and lubricant must be constantly supplied and discharged for continuous dissipation of the frictional heat.

SUMMARY OF THE INVENTION

The object of the invention is to create a rotary feed-through of the type mentioned in the introduction, which has a simpler construction and in addition to low wear and tear, also exhibits lower leakage losses both with the supply of cooling lubricant and also with the supply of compressed air.

This object is achieved by a rotary feed-through with the features as delineated herein. Preferred configurations and advantageous refinements of the invention are given in the following detailed disclosure.

For the rotary feed-through according to the invention, the sliding surfaces are also in contact when the supply of cooling lubricant or compressed air is switched. This prevents the creation of a gap between the sliding surfaces when the cooling lubricant supply is switched. Such a gap could lead to the escape of cooling lubricant still located in the supply line. A force is applied to the non-rotating sliding bushing in the direction of the hollow shaft so that its sliding surface is constantly pressed against the sliding surface of the hollow shaft. An additional axial load does not result with the supply of compressed air by radial introduction at the sliding bushing, which load would lead to greater contact pressure of the sliding bushing on the sliding surface of the hollow shaft. Only with the supply of cooling lubricant is the contact pressure increased in order to achieve an optimal seal.

BRIEF DESCRIPTION OF THE DRAWINGS

Further features and advantages of the invention come from the following description of a preferred embodiment with reference to the drawing. Shown are.

DETAILED DESCRIPTION OF PREFERRED EMBODIMENTS OF THE INVENTION

Figure 1:
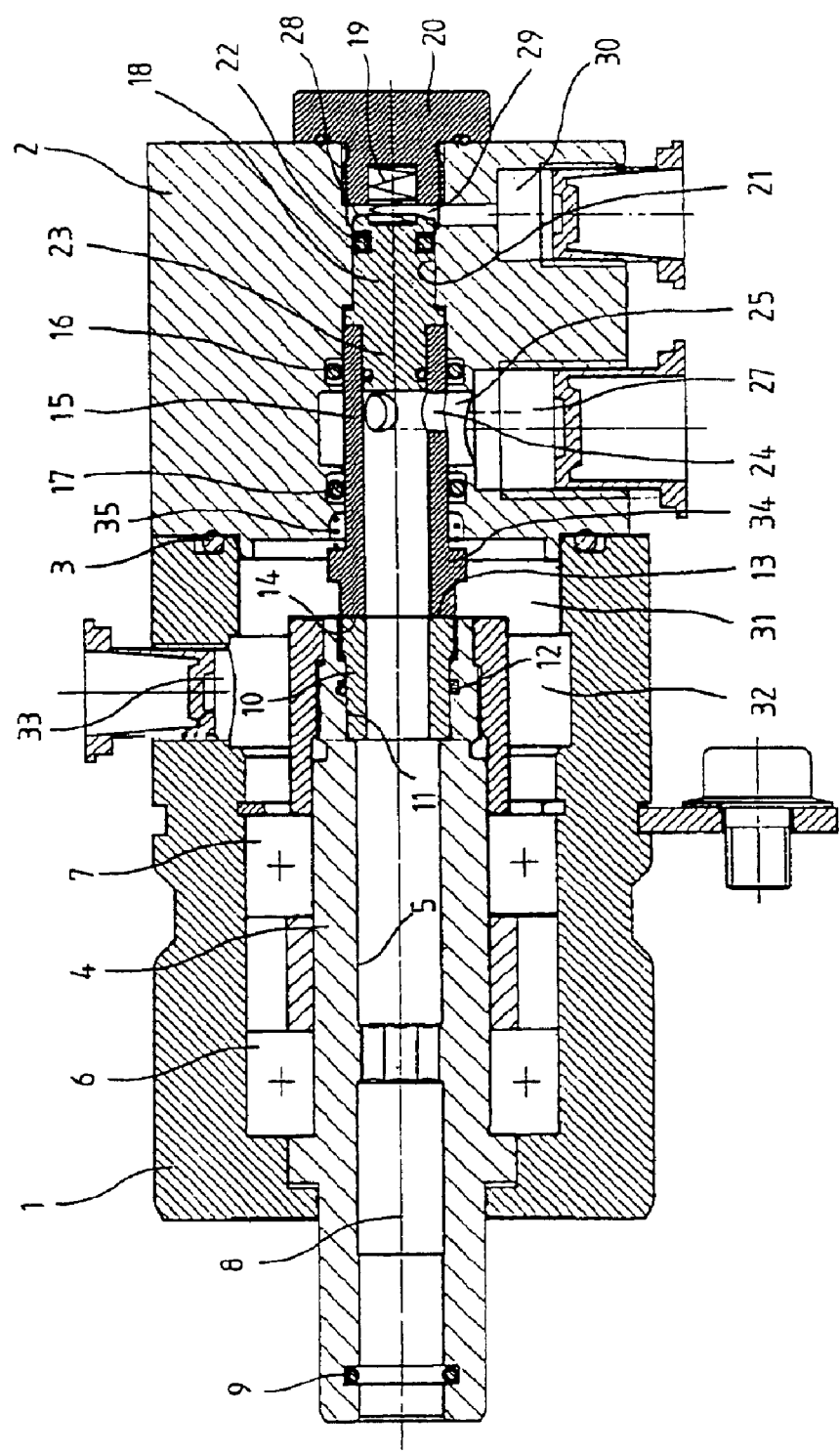
FIG. 1, a rotary feed-through in longitudinal section.

The rotary feed-through shown in FIG. 1 contains a housing with a front housing part 1 and a rear housing part 2 which is configured as a connecting piece. These parts are connected in a sealed manner to each other by a sealing ring 3. A hollow shaft 4 with a central passage channel 5 is mounted in the front housing part 1 so that the shaft can rotate about a center axis 8 by means of a front and rear rotary bearing 6 and 7, respectively. At the front end of the hollow shaft 4, e.g., a hollow tie rod of a machine tool working spindle is inserted into the passage channel 5 sealed by a sealing ring 9. At the rear end of the hollow shaft 4, there is a first sealing sleeve 10, which is connected rotationally fixed to and which rotates with this shaft. This is inserted into an expanded part 11 of the passage channel 5 at the rear end of the hollow shaft 4 and is sealed by a radial seal 12. The sealing sleeve 10 features a rear end sealing surface 13, which contacts a front end sealing surface 14 of a non-rotating sealing bushing 15. The sealing sleeve 10 and the sealing bushing 15 consist of a wear-resistant and temperature-resistant material, preferably ceramic or the like.

The sealing bushing 15, which is coaxial with the sealing sleeve 10, can move in the axial direction in the rear housing part 2 and is guided in a sealed manner through seals 16 and 17. At the rear end of the sealing bushing 15 there is a pressure piston 18, which is supported by a compression spring 19 on an end cap 20 mounted in the housing part 2. The pressure piston 18 is sealed in a corresponding hole 21 of the rear housing part 2 by a seal 22 and features a front end peg 23 projecting into the rear end of the sealing bushing 15 in a sealed manner. Several radial openings 24 are provided in the sealing bushing 15. These openings open into a first annular space 25 inside the housing part 2. The radial openings 24 are arranged such that these lie in front of the front end surface 26 of the end peg 23 of the pressure piston 18. A first supply channel 27 extending radially in the housing part 2 leads to the annular space 25.

Between the rear end surface 28 of the pressure piston 18 and the end cap 20, there is a second annular space 29. A second radial supply channel 30 leads to this annular space. This is arranged next to the first supply channel 27 in the radial direction in the housing part 2.

In the region of the interface between the sealing surface 13 of the rotating sealing sleeve 10 and the sealing surface 14 of the rotationally fixed sealing bushing 15, there is a collection space 31 and connected to this collection space there is an annular space 32 with a radial discharge line 33 in the housing part 1. The discharge line 33 is used to discharge leakage fluid output from the interface between the rotating sealing bushing 10 and the rotationally fixed sealing bushing 15 and collected in the collection space 31. A compression spring 35 is tensioned between an annular collar 34 of the sealing bushing 15 and the housing part 2. This spring applies a force on the sealing bushing 15 in the direction of the hollow shaft 4 such that the sealing bushing 15 with its sealing surface 14 is constantly pressed against the sealing surface 13 of the sealing sleeve 10.

Figure 2:
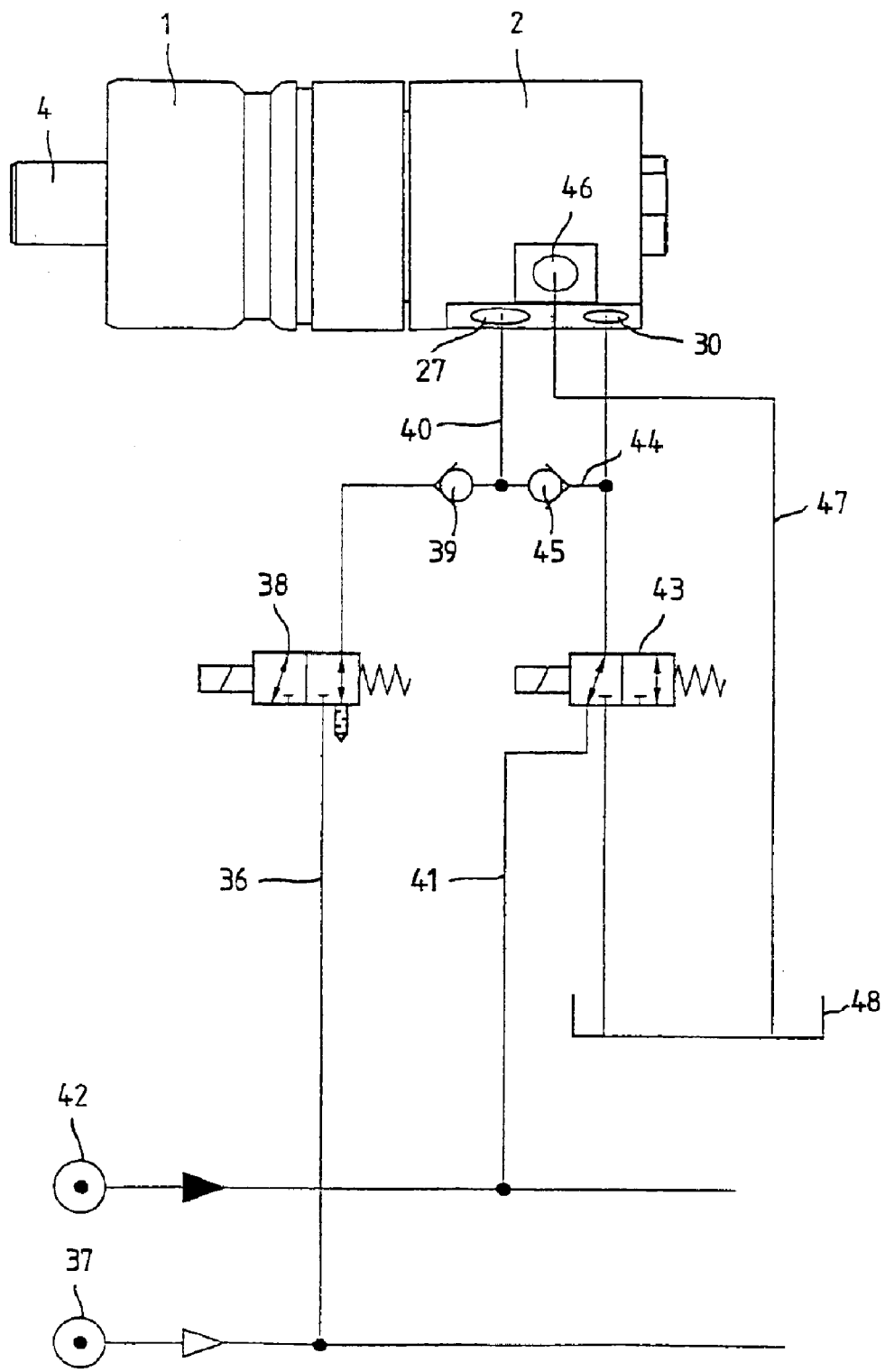
FIG. 2, the rotary feed-through with connections for a cooling lubricant and for air.

As can be seen from FIG. 2, the two supply channels 27 and 30 are connected to a supply device shown schematically in this figure. This includes a compressed air supply line 36, which leads from a compressed air source 37 via a first on-off valve 38 and a first check valve 39 to a line 40 attached to the first supply channel 27. The supply device also includes a cooling lubricant supply line 41, which opens from a cooling lubricant source 42 via a second on-off valve 43 to the second supply channel 30 and also via a bypass 44 with a second check valve 45 into the line 40 downstream of the first check valve 39. The two check valves 39 and 45 shown in FIG. 2 outside the housing can also be integrated in the rear housing part 2. In the rear housing part 2 there is also a radial opening 46, which leads to an intermediate space arranged between the seals 16 and 22. Thus, leakage fluid collecting between the seals 16 and 22 for equalization is discharged by a line 47 into a collection container 48.

For the switch position shown in FIG. 2, the first on-off valve 38 is closed and the second on-off valve 43 is activated, so that the cooling lubricant is supplied to both supply channels 27 and 30. Through the supply of the cooling lubricant to the supply channel 30, the contact pressure between the sealing surfaces 13 and 14 increases, which reduces leakage of the lubricant supplied via the line 36 to the interface between the sliding sleeve 10 and the sliding bushing 15. In contrast, with the supply of compressed air, the supply channel 30 is vented so that the contact pressure decreases and thus too much wear and tear on the sealing surfaces 13 and 14 is prevented.

What is claimed is:

1. A rotary feed-through device for selectively supplying cooling lubricant or air to a rotating machine part, the device including a hollow shaft supported to rotate in a first housing part, a first sealing surface, a sealing bushing coaxial with the hollow shaft and axially movable within a second housing part, and a second sealing surface pressed into continuous contact with the first sealing surface, wherein the second housing part contains a first lateral supply channel attachable to a coolant supply line or a compressed air supply line for supping cooling lubricant or compressed air via at least one radial opening in the sealing bushing, a pressure piston closing the rear end of the sealing bushing for increasing the contact pressure between the sealing surfaces, and a second supply channel charged during the supply of cooling lubricant for supplying cooling lubricant to the pressure piston to increase the contact pressure between the sealing surfaces.

2. The rotary feed-through device according to claim 1, wherein the force is applied to the sealing bushing by a compression spring supported on the second housing part in the direction of the hollow shaft, such that the sealing surface of the sealing bushing is constantly pressed against the sealing surface of the hollow shaft.

3. The rotary feed-through device according to claim 1, wherein the first sealing surface is provided at the rear end of a sealing sleeve inserted into the hollow shaft.

4. The rotary feed-through device according to claim 1, wherein the pressure piston is inserted into the rear end of the sealing bushing.

5. The rotary feed-through device according to claim 1, wherein the the pressure piston has a front end peg projecting into the rear end of the sealing bushing in a sealed manner.

6. The rotary feed-through device according to claim 1, wherein the pressure piston is supported by a compression spring at a rear end cap mounted in the second housing part.

7. The rotary feed-through device according to claim 1, wherein in the region of the interface between the sealing surfaces of the hollow shaft and the sealing bushing within the first housing part there is a collection space connected by an annular space to a discharge line.

8. The rotary feed-through device according to claim 1, wherein the supply channels are connected to a device for supplying compressed air and cooling lubricant.

9. The rotary feed-through device according to claim 8, wherein the supply device contains a compressed air supply line leading from a compressed air source vie a first on-off valve and a first check valve to a line attached to the first supply channel.

10. The rotary feed-through device according to claim 9, wherein the supply device contains a cooling lubricant supply line opening from a cooling lubricant source via a second on-off valve to the second supply channel and over a bypass with a second check valve into the line downstream of the first check valve.

11. The rotary feed-though device according to claim 9, wherein the first check valve is integrated into the second housing part.

12. The rotary feed-through device according to claim 10, wherein the second check valve is integrated into the second housing part.

* * * * *